United States Patent
Molteni et al.

[11] Patent Number: 5,886,799
[45] Date of Patent: Mar. 23, 1999

[54] POLARIZING HOLOGRAPHIC REFLECTOR MODULE AND METHOD FOR THE MANUFACTURE THEREOF

[75] Inventors: William J. Molteni, Waltham; Philip J. Ralli, Medford, both of Mass.

[73] Assignee: Polaroid Corporation, Cambridge, Mass.

[21] Appl. No.: 825,120

[22] Filed: Mar. 27, 1997

[51] Int. Cl.[6] .............................. G02B 5/32; G02B 5/30; G02F 1/1335

[52] U.S. Cl. .................................. 359/15; 359/3; 349/96; 349/113; 349/162; 349/64

[58] Field of Search .................................. 359/15, 3, 487; 349/96, 113, 162, 64

[56] References Cited

U.S. PATENT DOCUMENTS

| | | | |
|---|---|---|---|
| 5,594,560 | 1/1997 | Jelley et al. | 359/15 |
| 5,691,790 | 11/1997 | Havens et al. | 359/15 |
| 5,721,600 | 2/1998 | Sumiyoshi et al. | 349/113 |
| 5,721,630 | 2/1998 | Horner et al. | 359/15 |
| 5,745,203 | 4/1998 | Valliath et al. | 359/15 |
| 5,812,229 | 9/1998 | Chen et al. | 359/15 |

FOREIGN PATENT DOCUMENTS

| | | | |
|---|---|---|---|
| 8220534 | 2/1995 | Japan | G02F 1/1335 |
| WO95/12826 | 5/1995 | WIPO | G02B 5/32 |
| WO96/37805 | 11/1996 | WIPO | G02F 1/1335 |

OTHER PUBLICATIONS

J. M. Tedesco, L. A. K. Brady, and W. S. Colburn. "Holographic Diffusers for LCD Backlights and Projection Screens." *SID 93 Digest*. 1993. pp. 29–32.

M. Wenyon and P. Ralli, "Mass Production of Volume Holographic Diffusers," 1994 SID Internatioanl Symposium Digest of Technical Papers, San Jose, CA (Jun. 14–16, 1994) (ISSN 0097–966X).

Wadle, Stephen, Daniel Wuest, John Cantalupo, and Roderic S. Lakes. "Holographic Diffusers." *Optical Engineering*. vol. 33, No. 1. Jan. 1994. pp. 213–218.

*Primary Examiner*—Jon Henry
*Attorney, Agent, or Firm*—Renato M. de Luna

[57] ABSTRACT

The present invention provides a polarizing holographic reflector module useful in the manufacture of a holographically-illuminated liquid crystal display assembly by combination thereof with a partial LCD stack. The polarizing holographic reflector module is substantially quadrangular in shape and comprises a reflective holographic diffuser, a light polarizer, a pressure sensitive adhesive, and a removable protective liner. A method of manufacture is also provided wherein a web of polarizer material having a linear or downweb orientation is roll-to-roll laminated to a web of angularly offset reflective holographic diffusers.

10 Claims, 2 Drawing Sheets

POLARIZING HOLOGRAPHIC REFLECTOR MODULE AND METHOD FOR THE MANUFACTURE THEREOF

FIELD OF THE INVENTION

The present invention is directed to a pre-oriented polarizing holographic reflector module useful in the manufacture of a holographically-illuminated liquid crystal display assembly, and to a method related to its manufacture, wherein polarizer material having a linear or downweb orientation is roll to roll laminated to a web of angularly offset reflective holographic diffusers.

BACKGROUND OF THE INVENTION

Electro-optical display devices are the object of considerable research efforts. Of the various display systems that have been developed, devices utilizing liquid crystals, in particular, have drawn commercial interest. For example, liquid crystal devices have found popular utility in display applications such as wrist watches, calculators, laptop computers, personal digital assistants, and the like.

Compositions characterized as liquid crystals include a wide range of materials. The different electrical and optical properties exhibited by these liquid crystalline materials make possible a number of mechanisms for light modulation. Such mechanisms include phase transitions, dynamic scattering, and field effects, all of which are well known in the art.

Field effect devices are of particular utility. The effect that is commercially most significant at present is the rotation of polarized light by a twisted nematic liquid crystal alignment and the disappearance of this effect when an electric field is applied across the device. Twisted nematic liquid crystal devices typically comprise a suitable liquid crystal composition confined between two optically transmissive plates, the plates having transparent conductive films affixed to their surfaces facing one another in the device. The alignment of the surface layers of the liquid crystal in the "off" state of the device is determined by the interaction of the liquid crystal composition with the confining surfaces of the display device. The orientation of the surface layers of the liquid crystal is propagated throughout the bulk of the composition. The nature of the alignment determines the off-stage optical properties of the device and the manner in which the liquid crystal molecules will be reoriented by an applied electric field.

To effect orientation of a confined liquid crystal, the internal surfaces of the conductive plates of a sandwich display device can be prepared by unidirectionally rubbing the surfaces prior to fabrication of the device. The liquid crystal molecules immediately adjacent to each rubbed surface tend to orient themselves in the same direction as the rubbing. By arranging the opposing conducting plates with the axis of the rubbed surface at, for example, right angles to each other, the liquid crystal molecules at points intermediate the two plates will orient themselves to a degree which is a function of the distance from the two plates. Accordingly, in this example, the liquid crystal will align itself in a continuous spiral path that twists through the 90° angle between the opposing plates.

If the light-rotating liquid crystal "sandwich" is mounted between a pair of crossed light polarizer elements, polarized light will pass into the device and be rotated through a 90° angle as it is transmitted through the twisted nematic crystal composition from one surface of the device to the other. Due to the 90° light rotation effected by the twist of the liquid crystal, the polarized light will be set to pass through the second crossed polarizer mounted on the opposing side of the display. In the prior art, it is known that by positioning a light reflector behind the second polarizer, the polarized light can be reflected back through the second polarizer to pass through and be rotated by the confined liquid crystal and then exit out the first polarizer where it was introduced.

When an electric field is applied across the liquid crystal composition between the two conductive plates, the twisted orientation of the liquid crystal is obliterated as the molecules align themselves with the applied field. As the liquid crystal is untwisted, polarized light entering the device through the first polarizer will no longer be rotated 90° as it is transmitted through the liquid crystal. Therefore, the non-rotated light will be unable to pass through the second polarizer which is set correspondingly crossed to the first polarizer. Selective application of voltages across discrete segments of the liquid crystal device can readily accomplish patterns of bright areas (no applied electric field, resulting in reflected light) and dark areas (applied electric field, resulting in no reflected light).

In conventional liquid crystal devices, backlighting and edgelighting are oftentimes the greatest source of power drain. To reduce the energy requirements of such devices, it has been found that displays adequately viewable under ambient light can be provided by replacing conventional light source elements with a brightly reflective holographic diffuser, the reflective holographic diffuser comprising either a volume phase reflection hologram diffuser, or —to accomplish achromaticity—the combination of a volume or surface holographic transmission diffuser and a reflection layer. See, U.S. Pat. No. 5,663,816 (Chen at al.) and U.S. Pat. No. 5,659,408 (Weyon). Although substantial differences exist among the varieties of liquid crystal display devices employing such passive holographic illuminating means, in respect to their operation generally, polarized ambient light passing through a liquid crystal display element is intercepted and reflected by the reflective holographic diffuser, the reflected light being retransmitted as diffused light toward and through the liquid crystal display element, typically with gain within a predetermined viewing angle.

While the commercial popularity of holographically-illuminated liquid crystal display devices continues to develop, desire to raise certain efficiencies in respect of the display's manufacture yet provides further avenues for improvement. In particular, in accomplishing gain and a desirable light diffusion pattern, the reflective holographic diffuser will characteristically manifest an optical asymmetry with a definite top-bottom orientation, an orientation that must be maintained in manufacture to accomplish operative predefined display parameters. However, the polarizer elements in LCD display devices also have a predefined operational axis.

Under current manufacturing processes, the rear polarizer and reflective holographic diffuser are incorporated separately, and consequently, compelling the adoption of separate alignment procedures. Aside from increasing the costs of manufacture, these additional procedures introduce the possibility of misalignment, hence, increasing the possible number of defective or otherwise unusable display units. Further, inasmuch as polarizing material is oftentimes supplied commercially on a supporting carrier substrate, the overall bulk of the finished product is correspondingly increased by the thickness of said substrate.

SUMMARY OF THE INVENTION

In response to the above need, the present invention provides a prealigned polarizing holographic reflector module useful in the manufacture of a holographically-illuminated liquid crystal display assembly. The module comprises a reflective holographic diffuser, a light polarizer, a pressure sensitive adhesive, and a removable protective liner. In one embodiment, both the reflective holographic diffuser and the light polarizer are substantially quadrangular in shape, and—in respect of a particular "prealignment"—the polarizing axis of said light polarizer is angled approximately ±45° relative to a predefined top edge of said reflective holographic diffuser. In use, after the protective liner is removed, the remaining parts of the module can be "stuck" onto the rear surface of a matching "partial LCD stack" with the same relative ease as the incorporation of a reflective holographic diffuser alone, without a prior incorporation of a rear polarizer.

To facilitate the mass production of the prealigned polarizing holographic reflector module, the present invention also provides a method of manufacture wherein a web of polarizer material having a linear or downweb orientation is roll-to-roll laminated (or otherwise deposited) onto a web of prealigned holographic elements. The holographic elements are aligned (cf., offset) on the web in such a way as to maintain their correct orientation in an envisioned LCD application and, by lamination, to give the polarizer the required operational orientation. Aside from facilitating the manufacture of a polarizing holographic reflector module, because the web of prealigned holographic elements can provide an adequate structural foundation for so-called "bare" or "freestanding" polarizing material, need for the aforementioned supporting carrier substrate is eliminated.

In light of the above, it is the principal object of the present invention to provide means for facilitating the manufacture of a holographically-illuminated liquid crystal display, specifically of the type where incorporated polarizer elements are offset at ±45° relative to the horizontal viewing axis.

It is an object of the present invention to provide a prealigned polarizing holographic reflector module comprising a reflective holographic diffuser, a light polarizer, a pressure sensitive adhesive, and a removable protective liner. To reduce bulk, the module can and preferably should consist essentially of these elements alone.

It is another object of the present invention to provide a method useful for the manufacture of said module, a method wherein polarizer material having a linear or downweb orientation is roll-to-roll laminated to a web of angularly offset reflective holographic diffusers. In preferred practice, the holographic web replaces and functions as the supporting carrier substrate otherwise used—as is typical—to "carry" said polarizer material.

For further understanding of the nature and objects of the invention, reference should be had to the following description taken in conjunction with the accompanying drawings.

BRIEF DESCRIPTION OF THE DRAWINGS

FIG. 2 also illustrates schematically the general angle and direction of reconstructive light, which itself corresponds to the general angle and direction of propagation of a reference wavefront during off-axis holographic recordation.

DETAILED DESCRIPTION

By the present invention, there is provided a polarizing holographic reflector module 10, the module being prefabricated, "free-standing", and customized for comparatively easy incorporation into a holographically-illuminated liquid crystal display assembly 210.

Figure 1:
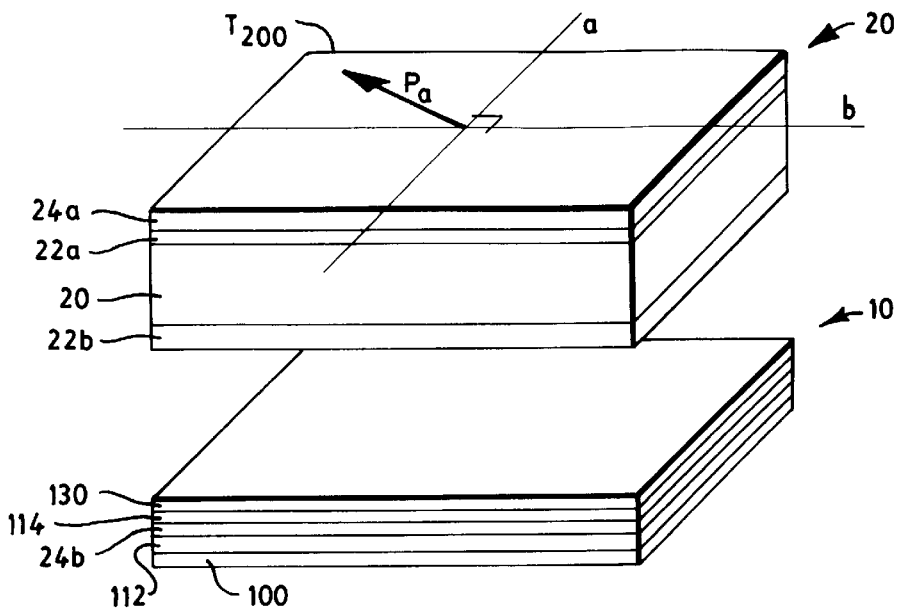
FIG. 1 illustrates schematically a partial LCD stack 200 and an embodiment of the polarizing holographic reflector module 10 according to the present invention. As is true with each of the FIGS., the relative locations, dimensions, and thickness' of the laminar structures have been exaggerated to facilitate discussion and presentation herein.
Figure 2:
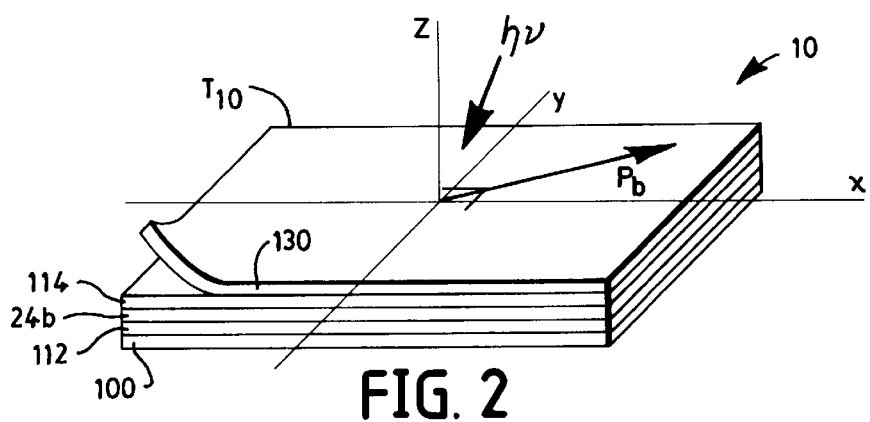
FIG. 2 illustrates schematically the removal of a removable protective liner 130 from the polarizing holographic reflector module 10 shown in FIG. 1, whereupon a pressure sensitive adhesive layer 114 is uncovered and made available for effecting a bond between partial LCD stack 200 and the reflective holographic diffuser 100.
Figure 3:
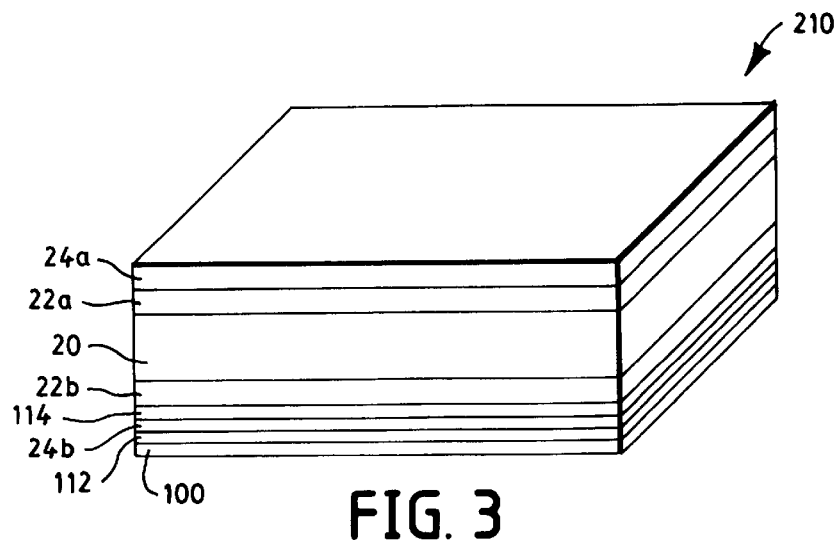
FIG. 3 illustrates schematically a holographically-illuminated liquid crystal display assembly 210, which combines the partial LCD stack shown in FIG. 1 with the uncovered module shown in FIG. 2, the two being united in register then bonded through pressure sensitive adhesive layer 114.

As shown sequentially by FIGS. 1, 2, and 3, the holographically-illuminated liquid crystal display assembly 210 is assembled by combining the polarizing holographic reflector module 10 with a corresponding partial LCD stack 200. The polarizing holographic reflector module 10 comprises (but preferably "consists essentially of") a reflective holographic diffuser 100, a light polarizer 24b, a pressure sensitive adhesive layer 114, and a removable protective liner 130. Typically, adhesive means 112 will also be employed between reflective holographic diffuser 100 and light polarizer 24b to effect an interfacial bond therebetween.

Properly installed, the reflective holographic diffuser 100 will provide the means for holographically illuminating the finished liquid crystal display assembly 200. Accordingly, reflective holographic diffuser 100 has a configuration capable of receiving ambient light, for example, light traversing said liquid crystal display element, and reflecting substantially uniform holographically-diffused light back through said liquid crystal display element with gain.

In provision of the aforementioned feature of pre-orientation, the reflective holographic diffuser 100 has both a substantially quadrangular planar shape, i.e., rectangular or square, and—as a consequence of its manufacture—a definite top-bottom orientation, said orientation itself defining a top edge $T_{10}$.

Several configurations are available for reflective holographic diffuser 100. For example, reflective holographic diffuser 100 can comprise either a holographic transmission diffuser backed with a light reflective layer, or a volume phase holographic reflection diffuser with or without an additional reflective backing.

To provide a holographic transmission diffuser, an object (or the surface thereof) having a desirable light diffusing capacity is holographically recorded in a holographic medium as an interference pattern (e.g., a fringe pattern or surface relief pattern) provided by the combination of an object wavefront and a reference wavefront in the holographic recording medium. During recordation, the object wavefront impinges upon the holographic medium subsequent to interruption by a suitable light diffusing object (or surface thereof), such as ground glass or white tile. At the same time, the reference wavefront—uninterrupted by the object—impinges upon the holographic medium from the same side. By appropriate control of the object wavefront and reference wavefront, an output cone ("zone" or "pupil") can be defined through which—upon "replay" of the holographic recordation—the majority of light is holographically propagated. With light propagated toward such predefined output cone, with little scattering elsewhere, brightness is enhanced (cf., "gain") because less light is "wasted" to scattering. Details of such holographic transmission diffuser can be found in the aforecited U.S. Pat. No. 5,659,408 (Wenyon).

To provide a volume phase holographic reflection diffuser, a holographic medium having opposite surfaces are simultaneously exposed to split components of a divided coherent wavefront. However, the exposure geometry and other associated exposing conditions are modified to accommodate the input of the diffused object wavefront and the reference wavefront from opposing sides. Details of such manufacture can be found in the aforecited U.S. Pat. No. 5,663,816 (Chen et al.). See also, U.S. Pat. No. 5,721,630 (Waldman and Horner)

Other details regarding reflective holographic diffuser 100 are discussed in respect of manufacturing methodology hereinbelow.

Regardless of whether a transmission holographic diffuser or a volume-phase reflection hologram diffuser is employed, it will be appreciated that in the present invention the hologram's recorded reference and object wavefronts propagate into a holographic recording medium "off-axis", i.e., angled away from the z-axis illustrated in FIG. 2, said z-axis being orthogonal with respect to the surface of the recording medium. It is the result of this off-axis recordation that produces optical asymmetry, and consequently, the aforementioned top-bottom orientation. Essentially, because the angle of input light best needed to effect reconstruction of the holographically recorded diffusion pattern corresponds to the incident angle of the reference wavefront at recordation, certain angles and directions of input light will produce "brighter" replay than others. Inasmuch as preferred embodiments of the present invention contemplate illumination by overhead ambient light, the top edge of the reflective holographic diffuser in said embodiments is the edge in the immediate incoming direction of the propagated reference wavefront. See, top edge $T_{10}$ in FIG. 2.

When employing a holographic transmission diffuser, a light reflective layer is required to reflect the holographically diffused light back through display assembly 200. In contrast, since a volume phase holographic reflection diffuser has interference fringes that function collectively to reflect input light, a light reflective layer would not be required. Nevertheless, one may be used if desired. In either case, the light reflective layer—typically a metallic foil—may be, for example, composed of an aluminum-vapor-deposited polyester film having a thickness of about 100 $\mu$m; or provided as a mirror, such as those made from silvered glass, glass with a conventional gray filter, polystyrene of gray or silver hue, or polypropylene; or prepared from a composition comprising reflective pigments dispersed in a suitable macromolecular organic binder. The light reflective layer may be configured to transmit some degree of light, thereby allowing the possibility of transflective applications. See U.S. Pat. No. 4,545,648, issued to J. L. Shulman and D. L. Clifford on Oct. 8, 1985.

As shown in FIG. 2, a light polarizer 24b having a planar shape substantially identical to the planar shape of the reflective holographic diffuser 100 is located atop reflective holographic diffuser 100. Overlappingly positioned (i.e., one on top of the other), light polarizer 24b and reflective holographic diffuser 100 share a common top edge $T_{10}$, i.e., the top edge of the light polarizer 24b is aligned with the top edge of the reflective holographic diffuser 100. Importantly, to provide the feature of pre-orientation in respect of light polarizer 24b, the light polarizer 24b is configured within polarizing holographic reflector module 10 such that its polarizing axis (see e.g., polarizing axis $P_b$ in FIG. 2) has an absolute angular offset, relative to the aforementioned top edge $T_{10}$, of from 1° to 90° (i.e., $|\pm 1°$ to 90°|), preferably approximately 45°. The polarizing axis $P_b$ will in most cases—as suggested further hereinbelow—correspond with the so-called "stretch" axis of the polarizer, i.e., the direction of polymeric and chromophoric orientation.

The pre-orientation of light polarizer 24b, operating in conjunction with the pre-orientation of reflective holographic diffuser 100, facilitates the manufacture of a typical holographically-illuminated liquid crystal display assembly 210, inasmuch as both the rear polarizing and holographic components thereof can be incorporated in a single-step, with concomitant consideration of orientation, registration, alignment, and the like required only in said single step. In practical terms, the polarizing holographic reflector module 10, pre-oriented as such, equips an LCD manufacturer with the unprecedented ability to incorporate both rear polarizing and holographic-illumination functionality into the architecture of an LCD with substantially the same comparative ease already employed in adding a reflective holographic diffuser alone.

In an interesting variation of the present invention, the reflection layer used behind a holographic transmission diffuser may be a reflective polarizer of the type discussed, for example, in U.S. Pat. No. 5,528,720, issued to Emmons et al. on Jun. 18, 1996; U.S. Pat. No. 5,422,756, issued to M. F. Weber on Jun. 6, 1995; U.S. Pat. No. 5,428,469, issued to S. J. Willets on Jun. 27, 1995; U.S. Pat. No. 5,333,072, issued Jul. 26, 1994 to S. J. Willets; U.S. Pat. No. 5,325,218, issued to Tritle et al. on Jun. 28, 1994; U.S. Pat. No. 5,334,849, issued to Bero et al. on Aug. 2, 1994; U.S. Pat. No. 5,062,691, issued to Papapolyme et al. on Nov. 5, 1991; U.S. Pat. No. 5,051,577, issued to Lutz et al. on Sep. 24, 1991; and U.S. Pat. No. 5,056,888, issued to Messerly et al. on Oct. 15, 1991. In such embodiment, the reflective polarizer backing eliminates the need for placement of the light polarizer 24b on the foremost surface of the reflective holographic diffuser. However, in keeping with characterizing aspects of the present invention, it will be appreciated that the polarizing axis of the reflective polarizer will nonetheless be aligned relative to the top edge $T_{10}$ in the same manner employed for embodiments wherein the polarizing material is positioned in front of the holographic diffuser.

To complete the polarizing holographic reflector module 10, a pressure sensitive adhesive 114 is deposited on the light polarizer 24b on the side opposite the reflective holographic diffuser 100, and subsequently covered with a removable protective liner 130.

The pressure sensitive adhesive 114 may be prepared from a composition comprising, for example, a major amount of one or more thermoplastic polymers and may optionally contain such other desired components as UV-absorbers, anti-static compositions, optical brighteners, inert fillers, and plasticizers. The pressure sensitive adhesive 114 should be sufficiently compatible with the light polarizer material and having a degree of optical transparency and clarity sufficient to substantially prevent depolarization, and other like optical distortions. The adhesion or sticking strength of the adhesive layer 114 may be satisfactory if it is about 200 g/22 mm or more. An example of a suitable pressure sensitive adhesive is a preformed, double-sided, pressure-sensitive adhesive tape, such as Polatechno AD-20 (from Polatechno Corp., Tokyo, Japan). Others will be known to those skilled in the art.

Removable protective liner 130 can be of any composition or manufacture that will adhere to pressure sensitive adhesive 114, yet remain easily and nondestructively removable, for example, by peeling. See FIG. 2. Materials for forming the liner 130 include, for example, paper-based liners, polyethylene terephthalate, polyether ether ketone, polyperfluoroethylene propylene, polyvinylidene fluoride, polyvinyl alcohol, etc. As the release liner 130 will be ultimately discarded, there are no requirements limiting its optical properties: The liner 130 can be opaque or transparent. Further, the protective liner may be coated or treated with surface energy reducing compositions to reduce or otherwise control the peel properties (i.e., removability) of the release liner.

As stated, the polarizing holographic reflector module 10 is useful in the manufacture of a holographically-illuminated liquid crystal display assembly 210 by combination thereof with a matching partial LCD stack 200. More particularly, by removal of the removable protective liner, the remaining reflective holographic diffuser 100 and light-polarizer 24b can be adhered onto the rear surface of partial LCD stack 200 by means of the now-uncovered pressure sensitive adhesive layer 114. Because the reflective holographic diffuser 100 and light polarizer 24b are pre-oriented relative to each other, only the overall orientation of the remaining module 10 need be considered in the final assembly.

The LCD stack 200 is considered "partial" herein in that it lacks one of the pair of polarizing elements required for operation of a conventional LCD arrangement. Other components of partial LCD stack 200—components that may or may not immediately be present at the assembly step—include, but are not limited to, such conventional components as front light polarizer 24a, front and rear conductive element 22a and 22b, and liquid crystal 20. Inasmuch as the present invention is concerned principally with the product configuration and manufacture of the pre-oriented polarizing holographic reflector module 10, moreso than the configuration and manufacture of the holographically-illuminated liquid crystal display assembly 210, the particular details of these conventional components are not critical and subject to additions, variations, and/or substitutions.

For example, a partial LCD stack may also include a front optically transmissive plate (not shown) covering and protecting the outwardly facing surface of light polarizer 24a. Such plate may be made of any suitable transparent or translucent sheet material including glass, plastic, and the like.

Likewise, conductive leads of elements 22a and 22b can be made from any conductive material of suitable optical quality; transparent conductive coatings of metallic oxide, such as tin oxide, are well known in the art. Further, conductive coatings 22a and 22b are connected by suitable electrical leads so that voltage can be applied across liquid crystal composition 20 by means of an electrical source (not shown).

And likewise, the liquid crystal 20 can be any molecules with anisotropic geometry, such as rod-shaped or disc-shaped, that exhibit stable states intermediate between liquid and solid, and which have comparatively lower molecular weights. While discussed primarily with reference to twisted nematic liquid crystals, the liquid crystal medium may contain any such liquid crystal compound useful in liquid crystal displays, or mixtures of such liquid crystal compounds. Useful are thermotropic liquid crystals which exhibit nematic and smectic (including ferroelectric) phases. Nematic phases include conventional uniaxial nematics, twisted nematics, and cholesteric mesophases. To effect the desired twist to the confined nematic light crystal composition, the interior conductive surfaces of elements 22a and 22b can be unidirectionally rubbed, the axes of the rubbed surfaces offset (e.g., at an angle 90°, or 45° in so-called quarter-wave plates) from each other.

Although partial LCD stack 200 shown is typical, it will be appreciated that the partial LCD stack need not include front light polarizer 24a, deferring incorporation 24a to a time subsequent to the use and incorporation of polarizing holographic reflector module 10. With or without a front polarizer, partial LCD stack 200 (as well as each of its components) will have a planar shape substantially identical to the quadrangular shapes of both reflective holographic diffuser 100 and the light polarizer 24b.

If the front polarizer 24a is already in place, then— relative to the top edge $T_{200}$ of partial LCD stack 200—its polarizing axis $P_a$ can have an absolute angular offset of from 1° to 90° (i.e., |±1° to 90°|), but is most preferably offset to define an absolute interior enclosed angle of approximately 45°. See FIG. 1. In any event, when combined with an appropriately matched polarizing holographic reflector module 10, the polarizing axes of front and rear light polarizers 24a and 24b, respectively, should be either crossed or parallel, as is needed in the manufacture of a typical liquid crystal display.

Figure 6:
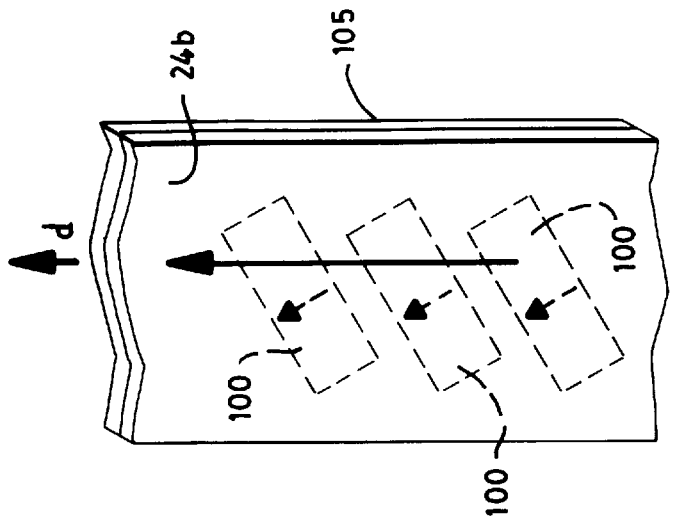
FIG. 6 illustrates schematically the web of polarizer material 24b and the hologram-bearing web 105 subsequent to the lamination of one against the other.
Figure 5:
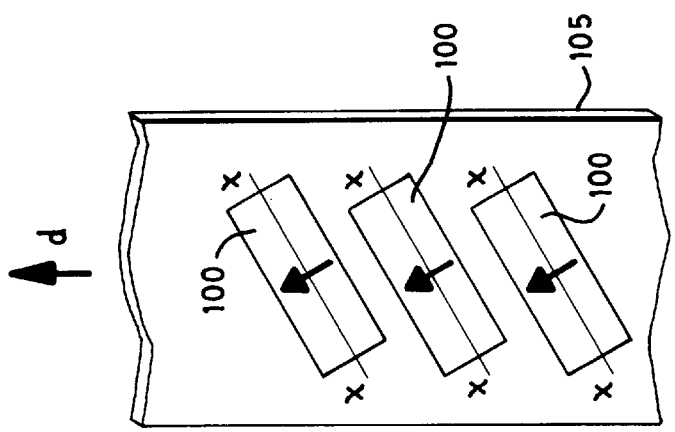
FIG. 5 illustrates schematically a web 105 comprising a plurality of reflective holographic diffusers 100.
Figure 4:
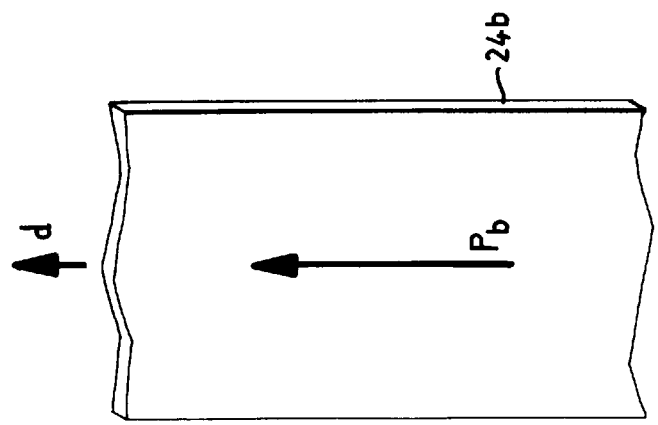
FIG. 4 illustrates schematically a web of polarizing material 24b.

In respect of the manufacture of the polarizing holographic reflector module 10, reference is made to FIGS. 4 to 6. As shown therein, a method can be employed wherein light diffusing holograms 100 are recorded on a web 105, prealigned in consideration of their anticipated orientation in polarizing holographic reflector module 10, the holographic prealignment being subsequently reaffirmed by the lamination thereupon of a correspondingly oriented web of polarizing material 24b.

As shown schematically in FIG. 4, the polarizing sheet material 24b has a linear polarizing axis $P_b$ substantially parallel with the web's downstream axis d.

The production of linear light polarizer is well described in the art. It is equally well known that linear light polarizers, in general owe their properties of selectively passing radiation vibrating along a given electromagnetic radiation vector (and absorbing electromagnetic radiation vibrating along a second given electromagnetic radiation vector) to the anisotropic character of the transmitting medium. The linear polarizing axis $P_b$ considered in the practice of the invention methodology is the axis that corresponds to the direction of the transmitted electromagnetic radiation vector.

A suitable polarizing sheet material 24b is the widely-used polyvinyl alcohol-iodine complex polarizer. It comprises linear polyiodide contained within a polyvinylalcohol matrix. The polyvinyl alcohol matrix is unidirectionally stretched to orient the transition moments of the absorbers, whereby the material becomes visibly dichroic. In such polarizers, the transmitting electromagnetic radiation vector corresponds with the stretch direction.

The manufacture of iodine-stained dichroic light polarizing elements has been described in numerous patents, including U.S. Pat. No. 2,237,567 (issued Apr. 8, 1941, to Edwin H. Land). Various improvements in methods for the production of light polarizers and in the light polarizing properties thereof have also been described, for example, in U.S. Pat. No. 2,375,963 (issued May 15, 1945, to Alexander Thomas); In U.S. Reissue Pat. No. 23,297 (reissued Nov. 28, 1950, to M. Hyman, Jr. et al.) ; and in U.S. Pat. No. 4,166,871 (issued Sep. 4, 1979, to N. W. Schuler).

If desired a polyvinylalcohol sheet material can be rendered dichroic by conversion of the polyvinyl alcohol molecules to polyvinylene light-polarizing species. This can be accomplished using hydrochloric acid vapor processing in known manner and as described in U.S. Pat. No. 2,445,555 (issued Jul. 20, 1948 to F. J. Binda). As with the polyvinyl alcohol-iodine complex, chromophoric orientation is accomplished by unidirectional stretching. Due to the good humidity resistance of such polyvinylene-based polarizers, their use is desirable for applications involving exposure to adversely humid or moist environmental conditions. Preferably, such polarizing material will also be borated for improved mechanical stability.

As shown in FIG. 5, the web 105 of exposed holographic recording media has a downstream axis d and a plurality of reflective or transmissive light diffusing holograms 100 recorded therein in areas substantially quadrangular in shape. Recordation can be accomplished by means and methodologies known in the art. Reference can be made, for example, to commonly-owned U.S. Pat. No. 5,659,408 (Weyon), U.S Pat. No. 5,721,630 (Waldman and Horner), and U.S. Pat. No. 5,576,853 (Molteni and Wenyon).

Recording media used for the reflective holographic diffuser 100 can be made of a variety of materials. Among the more important are: silver halide emulsions, hardened dichromated gelatin, ferrorelectric crystals, photopolymers, photochromics, and photodichroics. Characteristics of these materials are given in *Volume Holography and Volume Gratings*, by L. Solymar and D. J. Cook, Chapter 10, Academic Press, New York, 1981, pages 254–304. Composition that may be considered for use include DMP-128 (a proprietary photopolymer from Polaroid Corporation), dichromated gelatin, silver-halide based compositions, and compositions described in U.S. Pat. No. 4,588,664, issued to F. L. Fielding and R. T. Ingwall on May 13, 1986, and U.S. Pat. No. 4,696,876, issued to J. J. Cael on Sep. 29, 1987. For volume-phase holograms, DMP-128 is the preferred material and generally comprises a dye sensitizer, a branched polyethylenimine, and a free-radical ethylenically unsaturated monomer. Particular details of the composition can be found in the aforecited U.S. Pat. No. 4,588,664. See also, W. C. Hay and B. D. Guenther, "Characterization of Polaroid's DMP-128 Holographic Recording Medium", *Proceedings of the SPIE*, 883, pp. 102–105 (1988).

Certain details relating to the use of DMP-128 for the production of transmission holographic diffusers can be found in International Patent Application No. PCT/US96/06852 of Michael M. Wenyon (published Nov. 28, 1996, as International Publication No. WO 96/37805). See also, M. Wenyon and P. Ralli, *Mass Production of Volume Holographic Diffusers*, 1994 SID INTERNATIONAL SYMPOSIUM DIGEST OF TECHNICAL PAPERS, San Jose, Calif. (Jun. 14–16, 1994) (ISSN 0097-966X). Certain details relating to the use of DMP-128 for the production of volume-phase reflection holographic diffusers may be found in International Patent Application No. PCT/US94/11818 of Alan G. Chen et al. (published May 11, 1995, as International Publication No. WO 95/12826).

Regardless of the recordation methodology employed, the reflective or transmissive light diffusing hologram 100, as shown by the arrows in FIG. 5, will be recorded within a quadrangularly-shape area 100. To facilitate mass production in a "continuous web", the holographic exposure areas are offset at an angle set in anticipation of subsequent lamination with a web of polarizing material having a linear polarizing access correspondent with its (i.e., the polarizer web's) downweb axis. More particularly, since the lamination together of two continuous webs is more efficient when the webs are in register, rather than crossed, the holographic elements 100 are recorded in holographic web 105 such that they are already offset at the desired angle (i.e., 1° to 90°, preferably 45°) relative to the downweb axis of web 105. Thus, instead of 5 crossing webs and performing intermittent lamination step, the respective webs can be continuously and expeditiously united (i.e., interfacially bonded), in alignment (i.e., such that the downstream axis of the holographically-exposed web 105 is parallel with the downstream axis of the web of polarizing material 24b, and without compromise to the accomplishment of the preorientation that characterize polarizing holographic reflector module 10.

Bonding can be typically effected by the use of a suitable adhesive. The actual step of bonding will depend on the nature of the materials selected for the adhesive, the light polarizer 24b, and the reflective holographic diffuser 100. Those skilled in the art will know of the appropriate methodologies for applying and activating an adhesive layer to effect the bond between the webs of polarizing material and reflective holographic diffuser.

Once united, a unit corresponding to said quadrangularly-shaped 100 area is cut out of the interfacially bonded webs. Cutting can be made in a number of ways, including a rolling knife, a rotary or swing die, or a laser cutter. Other like means of "dinking out" or otherwise removing the unit 100 from the interfacially bonded webs will be apparent to the skilled artisan in light of the present application.

Inspection of the removed units will reveal that both the polarizing layer 24b and the reflective holographic diffuser are set with their respective functional optical axes in the correct and desired orientation. Thus—with the addition of pressure sensitive adhesive layer 114 and a removable protective liner 130—the removed unit would constitute an embodiment of the inventive polarizing holographic reflector module 10.

We claim:

1. A polarizing holographic reflector module useful in the manufacture of a holographically-illuminated liquid crystal display assembly by combination thereof with a partial LCD stack, the polarizing holographic reflector module comprising:

a reflective holographic diffuser having a foremost surface capable of receiving ambient light traversing said liquid crystal display element and redirecting holographically diffused light back through said liquid crystal display element with gain; the reflective holographic diffuser having a planar substantially quadrangular shape;

a light polarizer having a planar shape substantially identical to the shape of said reflective holographic diffuser, the light polarizer positioned on the foremost surface of said reflective holographic diffuser and aligned in substantially overlapping registration;

a pressure sensitive adhesive deposited on said light polarizer opposite said reflective holographic diffuser, the pressure sensitive adhesive capable of effecting an adhesive bond with said partial LCD stack; and a removable protective liner covering said pressure sensitive adhesive, the removable protective liner capable of being removed from and thereby uncovering said pressure sensitive adhesive.

2. The polarizing holographic reflector module of claim 1, wherein said linear polarizing axis has an absolute angular offset of approximately 45° relative to the top edge of said light polarizer.

3. The polarizing holographic reflector module of claim 1, wherein the reflective holographic diffuser is a volume-phase reflection holographic diffuser.

4. The polarizing holographic reflector module of claim 3, wherein the volume-phase reflection holographic diffuser reflects a horizontally elliptical light diffusion pattern.

5. The polarizing holographic reflector module of claim 1, where the reflective holographic diffuser comprises a volume-phase transmission holographic diffuser and a light reflecting layer, the light reflecting layer deposited onto said volume-phase transmission holographic diffuser opposite said foremost side of reflective holographic diffuser.

6. The polarizing holographic reflector module of claim 5, wherein the reflective holographic diffuser reflects an achromatic light diffusion pattern.

7. The polarizing holographic reflector module of claim 1, wherein the reflective holographic diffuser comprises an embossed holographic diffuser.

8. The polarizing holographic diffuser of claim 7, wherein the reflective holographic diffuser reflects an achromatic light diffusion pattern.

9. The polarizing holographic diffuser of claim 1, wherein the light polarizer is a dichroically stained, molecularly oriented sheet of polyvinyl alcohol.

10. The polarizing holographic diffuser of claim 1, wherein the light polarizer is a dichroically oriented sheet of polyvinylene.

* * * * *